United States Patent [19]

Miachon

[11] Patent Number: 5,267,936
[45] Date of Patent: Dec. 7, 1993

[54] MULTI-STAGE CENTRIFUGAL EXTRACTORS FOR SEPARATING LIQUIDS OF DIFFERING DENSITIES WHEREIN RECYCLING OF PORTIONS OF THE SEPARATED LIQUIDS OCCURS AT EACH STAGE

[75] Inventor: Jean-Paul A. Miachon, Lyons, France

[73] Assignee: Societe Robatel, Genas, France

[21] Appl. No.: 865,331

[22] Filed: Apr. 8, 1992

[30] Foreign Application Priority Data

Apr. 8, 1991 [FR] France .................................. 91 04466

[51] Int. Cl.$^5$ .............................................. B04B 5/06
[52] U.S. Cl. ............................................ 494/22; 494/35; 494/43; 494/65; 210/194; 422/258; 422/259
[58] Field of Search .................. 494/22, 35, 42, 43, 494/50, 51, 56, 60, 62, 63, 65, 85; 210/194, 196, 360.1, 360.2, 378, 380.1, 383, 781, 787; 366/134, 136, 137, 168, 172, 305; 422/257–259

[56] References Cited

U.S. PATENT DOCUMENTS

| | | | |
|---|---|---|---|
| 2,234,921 | 3/1941 | Webb | 494/22 X |
| 2,474,006 | 6/1949 | Maycock | 210/194 X |
| 2,474,007 | 6/1949 | Maycock | 210/194 X |
| 2,776,193 | 1/1957 | Habicht . | |
| 3,344,981 | 10/1967 | Podbielniak et al. | 494/22 |
| 3,438,573 | 4/1969 | Dollfus et al. | 494/22 |
| 3,459,368 | 8/1969 | Dollfus | 494/22 |
| 3,656,685 | 4/1972 | Kjellgren | 494/42 |
| 4,039,348 | 8/1977 | Hunwick | 494/42 X |
| 4,747,694 | 5/1988 | Nyman et al. . | |
| 4,857,040 | 8/1989 | Kashihara et al. | 494/22 |
| 4,959,158 | 9/1990 | Meikrantz | 210/787 |
| 5,024,647 | 6/1991 | Jubin et al. | 494/65 X |

FOREIGN PATENT DOCUMENTS

| | | | |
|---|---|---|---|
| 632375 | 11/1978 | U.S.S.R. | 422/258 |
| 731987 | 5/1980 | U.S.S.R. | 422/258 |
| 2252258 | 8/1992 | United Kingdom . | |

Primary Examiner—Philip R. Coe
Assistant Examiner—Charles Cooley
Attorney, Agent, or Firm—Dowell & Dowell

[57] ABSTRACT

Multi-Stage centrifugal extractors for separating two liquids of differing densities wherein each stage includes a decantation chamber which surrounds and receives liquids from a mixing chamber and wherein a portion of at least one of the separated liquids is recycled from the decantation chamber to the mixing chamber at each stage.

5 Claims, 5 Drawing Sheets

MULTI-STAGE CENTRIFUGAL EXTRACTORS FOR SEPARATING LIQUIDS OF DIFFERING DENSITIES WHEREIN RECYCLING OF PORTIONS OF THE SEPARATED LIQUIDS OCCURS AT EACH STAGE

BACKGROUND OF THE INVENTION

1. Field of the Invention

The present invention relates to improvements in centrifugal extractors of the single-stage and multi-stage type and more particularly to the production of a system for recycling one or the other of the two liquids recovered after decantation 2. History of the Related Art Reference may advantageously be made to Applicants' French Patents Nos. 1 541 754, 2 093 055, 2 255 958 and 2 417 324, concerning the general arrangement of centrifugal extractors of the type envisaged by the invention.

It will be noted that a single-stage centrifugal extractor includes a fixed vessel, inside which a decanter bowl is driven in rotation. The lower part of the bowl is constituted by a suction turbine which is possibly associated with an auxiliary agitator The turbine and the agitator are placed at the level of a mixing vat or chamber at the base of the fixed vessel. This vat comprises radial pipes opening outside the vessel for supplying the two liquids to be mixed.

The upper part of the vessel comprises two compartments for collecting the liquids separated in the bowl. These compartments communicate via outer orifices with the outside or with the inlet of an adjacent centrifugal extractor.

Two liquids of different densities (a heavy phase and a light phase) are introduced into the vat of the vessel and are intimately mixed. The mixture is then sucked inside the bowl in order to be separated therein under the action of centrifugal force. The two separated liquids are thus respectively discharged continuously in the compartments provided in the upper part of the vessel.

Furthermore, a multi-stage centrifugal extractor essentially comprises a common bowl mounted to rotate about its axis of symmetry, agitators carried by a shaft which is fixed or rotates about the same axis at a lower speed than that of the bowl, and, finally, deflectors forming baffles fixed on the bowl, thus defining therewith grooves or chambers with circular edges.

It is then ascertained that each of the mixing chambers is intercalated between two decantation chambers, and vice versa. Each decantation chamber comprises a spout for the light phase which opens out above the mixing chamber of the lower stage and a vertical channel for evacuating the heavy phase which opens out above the mixing chamber of the upper stage. This arrangement thus allows the heavy phase liquid and the light phase liquid to pass through the centrifugal extractor in opposite directions.

Such centrifugal extractors present certain drawbacks concerning the efficiency of the transfer of the solutes from one phase in the other. This drawback is especially due to the decantation effected subsequently, or to the flowrates of the two liquids which are too different.

It is a particular object of the present invention to overcome these drawbacks.

SUMMARY OF THE INVENTION

The object of the invention is to provide means for drawing off one of the two liquids at the outlet of the decantation chamber and for reintroducing it in the mixing zone of the centrifugal extractor.

This stage of drawing-off or of recycling of one of the two liquids contained in the centrifugal extractor makes it possible to modify the content of the two phases mixed inside the vat to obtained a better decantation or a better transfer.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
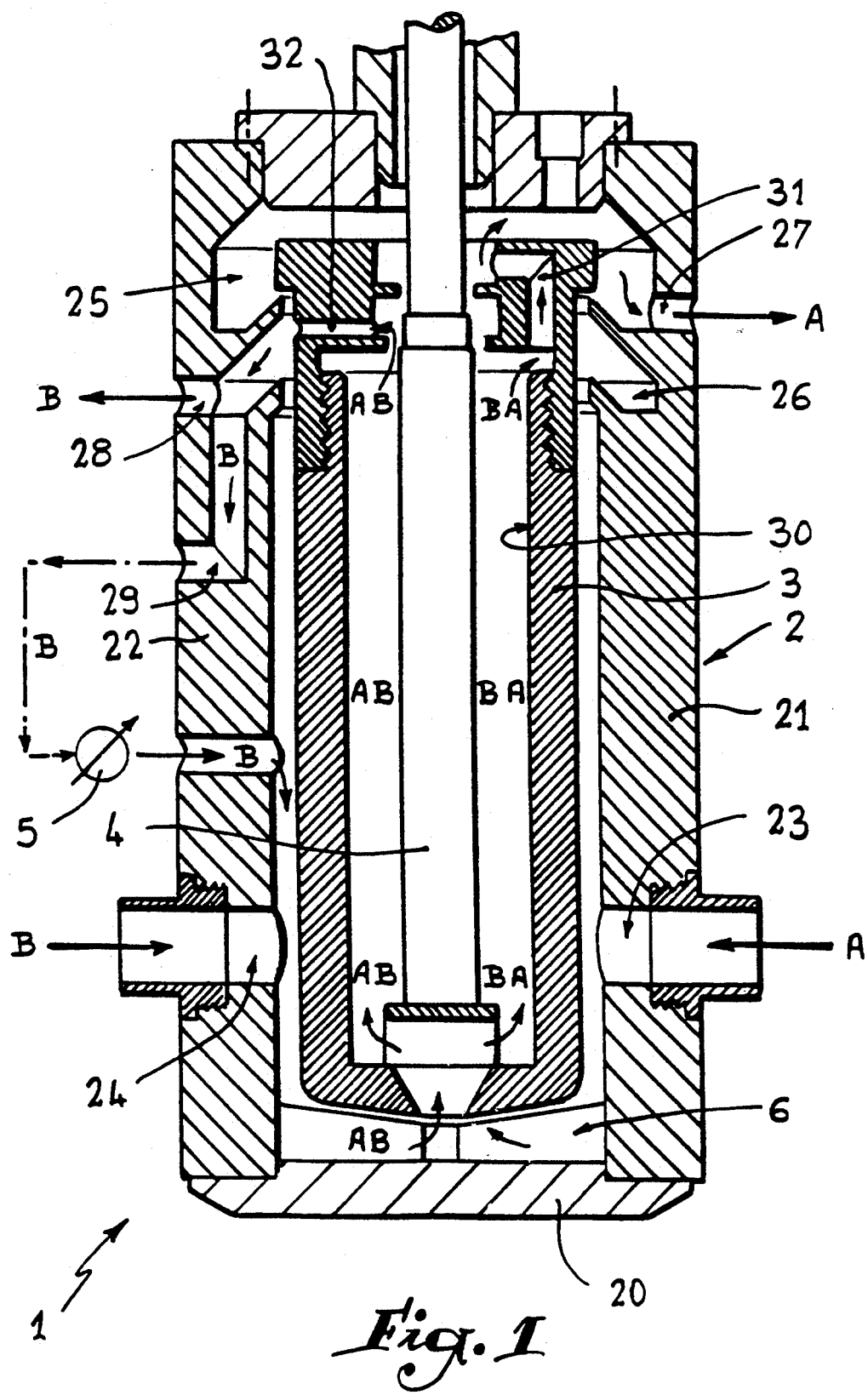
FIG. 1 is a view in vertical section illustrating a single-stage centrifugal extractor according to the present invention.

Referring now to the drawings, FIG. 1 shows a single-stage centrifugal extractor 1 comprising a fixed vessel 2 inside which is provided a decanter bowl 3 which is driven in rotation about its axis of symmetry by a vertical drive shaft 4.

Above the bottom 20 of the vessel 2 and in the lateral walls 21, 22 are two holes 23, 24. In the upper, inner part of the lateral walls 21 and 22 are formed two annular collecting compartments 25, 26, disposed one above the other and communicating respectively with the outside of the vessel via openings 27, 28.

The bottom of compartment 26 is provided with a channel 29 which may be combined, for example, with a positive displacement pump 5, which communicates inside vessel 2, above the lateral hole 24.

The decanter bowl 3 placed inside the vessel 2 comprises at its base a suction turbine possibly associated with an auxiliary agitator known per se and not shown. This assembly allows the connection between the inner part 30 of the bowl 3 and the free space 6 formed between the bottom 20 of the vessel 2 and the base of the bowl. The free space constitutes, in known manner, a vat or mixing chamber with the same reference 6, which communicates with the outside or with an adjacent centrifugal extractor via the lateral holes 23 and 24, as will be seen hereinafter.

The upper part of the decanter bowl 3 includes two annular orifices 31 and 32 which open out respectively above the collecting compartments 25 and 26.

The single-stage centrifugal extractor which has just been described functions as follows:

The liquid A to be treated (heavy phase) and the treatment liquid B (light phase) are conducted into vat 6 of the extractor via the lateral holes 23 and 24. These liquids may come either directly from the outside or from an adjacent centrifugal extractor so as to improve the quality of the transfer between the two liquids.

Liquids A and B are mixed under the effect of the agitator and the difference in speeds between the decanter bowl 3 and the vessel 2. The mixture of two liquids is drawn, by the turbine known per se, in the inner part 30 of the decanter bowl 3, with the result that the heavier component is separated from the lighter under the effect of centrifugal force. The lighter component B escapes by overflow via orifice 32 to be collected in the annular compartment 26 of the vessel 2, while the heavier component A flows through orifice 31 to be collected in compartment 25 with a view to evacuation thereof to the outside via opening 27. Such evacuation may for example be effected by different pipes leading towards another adjacent centrifugal extractor.

The lighter component is separated into two flow paths under the effect of the positive displacement pump 5 which draws a portion of the component and reintroduces it into the mixing chamber 6 so as to mix it with liquids A and B coming from lateral holes 23 and 24. The other part of the light phase B leaving the compartment 26 is directed via opening 28 either to the outside, or towards another extractor, as already specified.

The positive displacement pump 5 may possibly be replaced by a fixed or adjustable nozzle. The difference in level between the compartment 26 and the channel 29 for reintroduction of the recycled liquid makes it possible to ensure the pressure necessary for flow.

Recycling may, of course, be effected in the same manner for the heavy phase liquid A.

FIGS. 2 to 5 show a multi-stage centrifugal extractor comprising a device according to the invention for recycling one or the other of the liquids circulating inside the extractor.

The multi-stage centrifugal extractor 100 comprises, in known manner, a decanter bowl 300 common to all the stages. The bowl is mounted to rotate about its axis of symmetry inside a fixed housing (not shown). In the middle of the bowl 300 and along the same axis of symmetry, there is provided a shaft 400 which is mounted either fixed, or to rotate at a speed lower than that of the bowl.

Shaft 400 comprises agitators 401 disposed at equal distances, whose functioning will be seen more readily hereinbelow.

The decanter bowl 300 is constituted by a certain number of stages which are of the same structure, but offset angularly with respect to one another to ensure communication of the liquids from one to the other.

In fact, the decanter bowl 300 comprises at each stage deflectors 301, 302, 303, 304, 305 and 306 which define channels 307, 308, 309, 310, a mixing chamber 311 and a decantation chamber 312.

It will be noted that each of the mixing chambers 311 is spaced between two decantation chambers 312, and, reciprocally, two mixing chambers surround a decantation chamber. As a general rule, each of the decantation chambers 312 comprises a vertical channel 308 which communicates with a horizontal channel 307 so as to open out above each of the mixing chambers 311 of the stages located directly above.

The agitators 401 secure to the fixed or rotating shaft 400 are placed in known manner in the mixing chambers 311 of each stage of the centrifugal extractor 100.

The deflectors 301 and 303 of each stage of the extractor include with a vertical hole 313 allowing the decantation chamber 312 to communicate directly with the mixing chamber 311 of the same stage. The vertical hole 313 is made between the channels 309 of the same stage of the decanter bowl 300. At one of the ends of the hole 313 is hermetically mounted a pipe 314 which, depending on the case, opens out either on the side of the outer diameter of the decantation chamber 312 (FIGS. 2 and 3), on the side of the fixed or rotating shaft 400 (FIG. 4), or in the middle of the decantation chamber 312 (FIG. 5).

The multi-stage centrifugal extractor 100 described hereinabove functions as follows:

The heavy phase liquid A decanted in one of the chambers 312 rises to the higher stage via channels 308, 307 to be poured on the deflector 306 of the stage in question which acts as a spout threshold. Simultaneously, the light phase liquid B decanted in one of chambers 312 drops to the lower stage, passing over deflector 301 so as to collect on the surface of the liquid A mentioned above. The two liquids A and B are poured into channel 310 defined by the deflectors 304 and 306 in order to flow into the mixing chamber 311.

The agitator 401 of the fixed or rotating shaft 400 finishes mixing the two liquids A and B in order that the emulsion flows above the edge of the deflector 303 and into the channel 309 made between deflectors 302 and 303. The emulsion AB is poured, on leaving channel 309, into the decantation chamber 312 where the two liquids are decanted by centrifugation.

Figure 2:
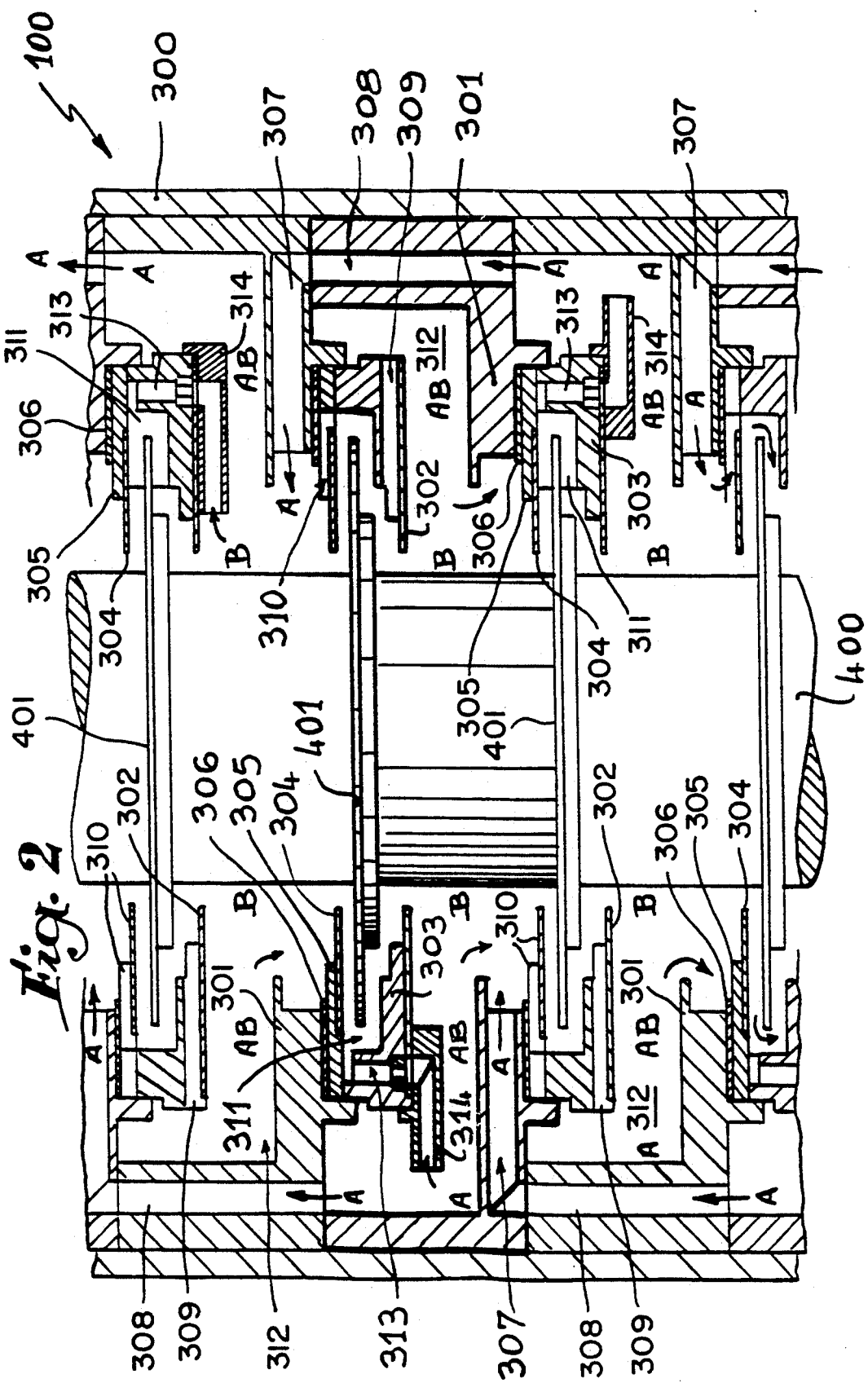
FIG. 2 is a transverse section showing a multi-stage centrifugal extractor provided with a system for recycling the heavy phase liquid.
Figure 3:
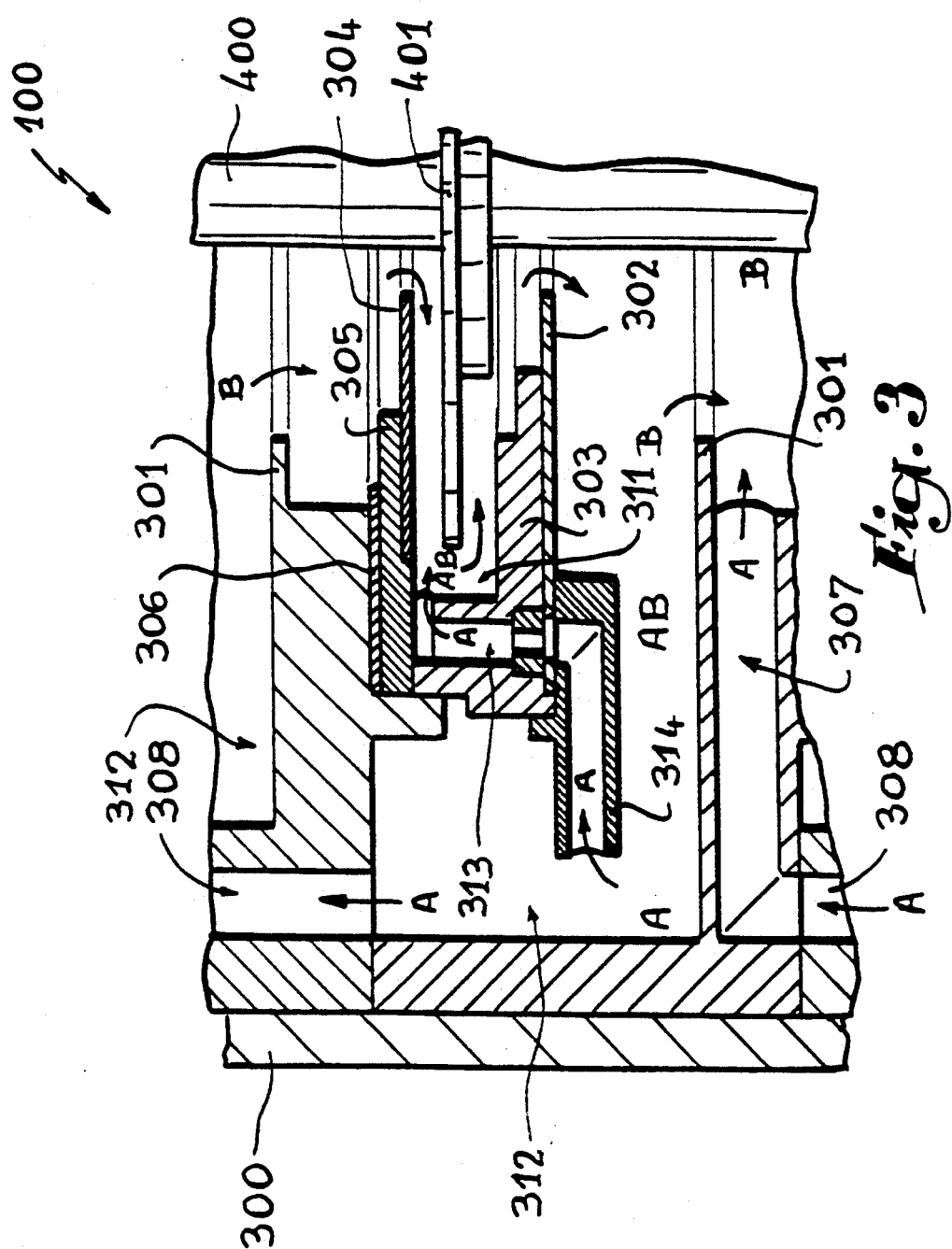
FIG. 3 is an enlarged detailed view showing the recycling system of FIG. 2.

In FIGS. 2 and 3, it will be noted that, when the heavy phase liquid A is decanted, part of it traverses the pipe 314 and the hole 313 to be poured into the mixing chamber 311 of the same stage. Simultaneously, the other part of the liquid A takes channels 308 and 307 to effect the different steps described previously. There is, therefore, clearly a phenomenon of recycling.

Figure 4:
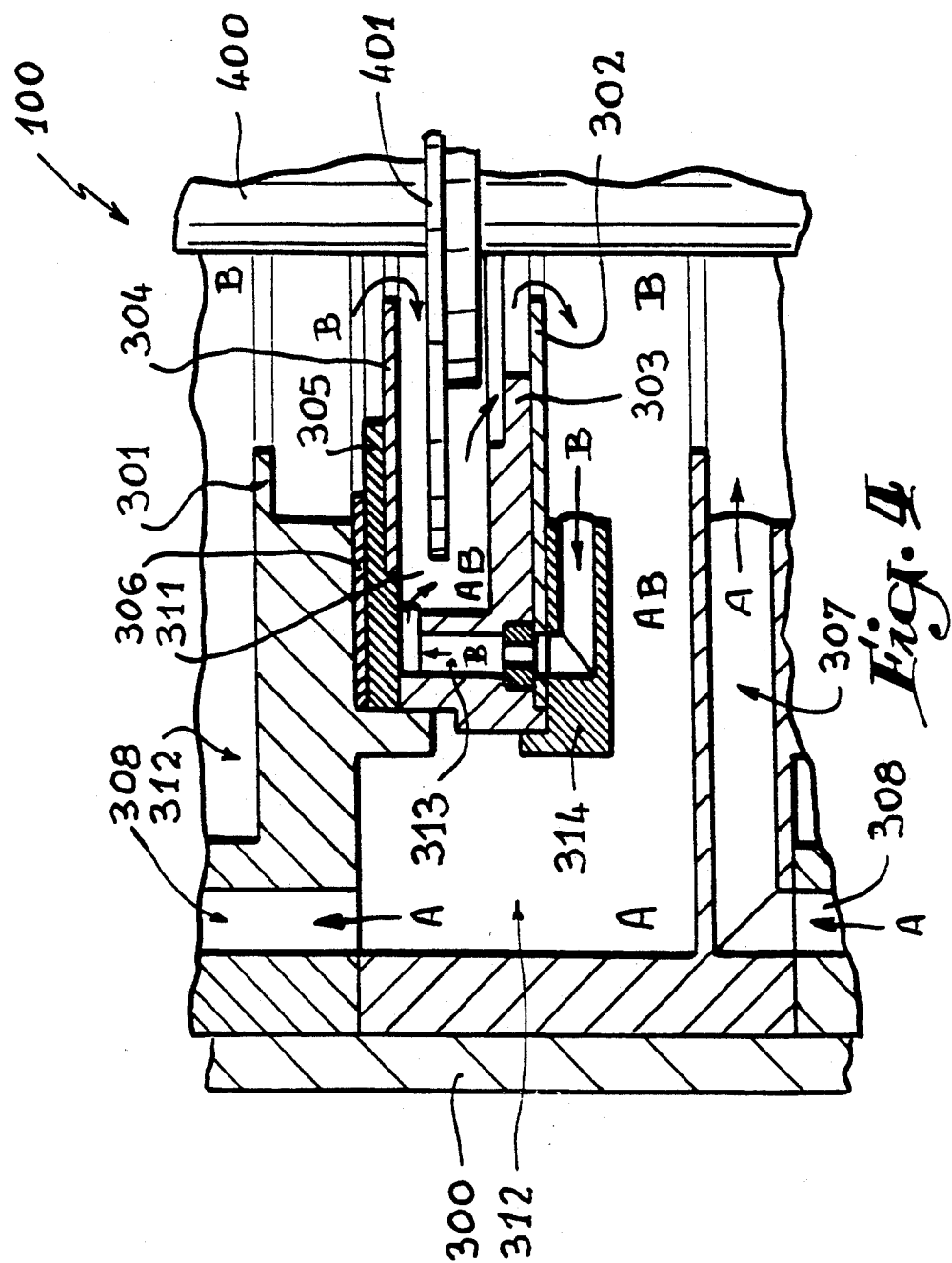
FIG. 4 is a view similar to that of FIG. 3, but illustrating a system for recycling the light phase liquid of a multi-stage centrifugal extractor.
Figure 5:
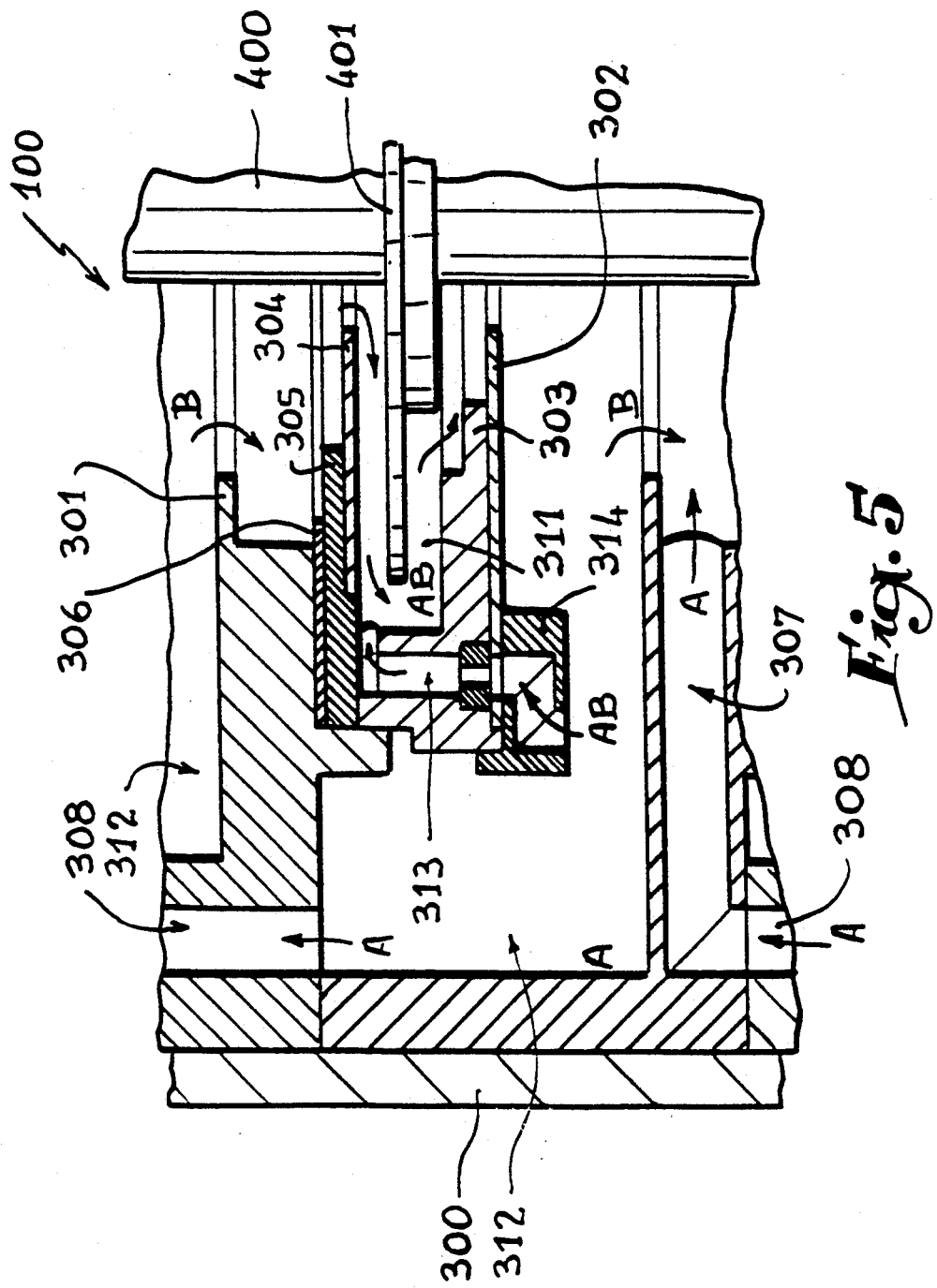
FIG. 5 is a detailed view showing a variant of the recycling system at the level of the two mixed liquids inside a multi-stage centrifugal extractor.

In FIG. 4, a part of the light phase liquid B is drawn off by means of pipe 314 and reintroduced it into the mixing chamber 311 of the same stage, while the other part of the liquid B overflows above the deflector 301 and descends to the lower stage.

In FIG. 5, part of the emulsion of the two liquids A, B is recycled before decantation thereof, in order to conduct them both by the pipe 314 and the hole 313 into the mixing chamber 311.

Of course, the recycling of one or the other of liquids A and B in the mixing chamber 311 via the pipe 314 and the hole 313 is effected when the pressure established in the bottom of the mixing chamber 311 is lower than that prevailing in the decantation chamber 312.

The pressure of the decantation chamber 312 is determined by the density of liquids A and B, by the thickness of the liquids and by the speed of rotation of the liquids, which is virtually equal to the speed of rotation of the decanter bowl 300.

The pressure in the mixing chamber 311 is determined by the density of liquids A and B, by the thickness of these liquids and by the speed of rotation of the liquids which is lower than that of bowl 300, as agitators 401 slow down the speed of the liquids.

In fact, by appropriately dimensioning the agitators 401, it is possible adequately to slow down the speed of the liquids in the mixing chambers 311 in order to create a difference in pressure between the bottom of the chambers and the decantation chambers 312.

It will also be noted that it is possible to combine in the same centrifugal extractor 100, recycling pipes 314 for heavy phase (FIGS. 2 and 3) and for light phase (FIG. 4) at different stages.

Similarly, the axis of symmetry of the extractor 100 may be horizontal or inclined, without the functioning thereof being changed.

What is claimed is:

1. A multi-stage centrifugal extractor for separating two liquids of different densities by separating the liquids by centrifugal action so that the heavier liquid is directed outwardly with respect to the lighter liquid between the stages comprising, a decanter bowl having an outer portion and a central axis about which said bowl rotates, a shaft extending along said axis, each of the stages of the extractor including an agitator means mounted on said shaft, deflector plates mounted in spaced relationship from and on opposite sides of each of said agitator means and said deflector plates defining mixing chambers therebetween, a decantation chamber generally surrounding each of said mixing chambers, first passageways adjacent said outer portion of said bowl for communicating the heavier fluid to adjacent stages and second passageways adjacent said shaft for communicating the lighter fluid to adjacent stages in a direction opposite to said stages with which said first passageways communicate, means for communicating said decantation chamber with said mixing chamber at each stage whereby a portion of the liquid within the decantation chambers is recycled into said mixing chamber of the same stage, and said means for communicating said decantation chambers with said mixing chambers including an opening through one of said deflector plates and a pipe element mounted to said one of said deflector plates so as to be in communication with said opening.

2. The multi-stage centrifugal extractor of claim 1 in which said pipe element includes an inlet oriented outwardly with respect to said axis so as to recycle the heavier of the liquids within said decantation chamber.

3. The multi-stage centrifugal extractor of claim 1 in which said pipe element includes an inlet oriented toward said axis so as to recycle the lighter of the liquids within said decantation chamber.

4. The multi-stage centrifugal extractor of claim 1 in which said pipe element includes an inlet oriented generally parallel with respect to said axis so as to recycle both the heavier and lighter liquids within said decantation chamber.

5. The multi-stage centrifugal extractor of claim 1 in which said pipe element of one of said stages is oriented outwardly with respect to said axis so as to recycle heavier liquids within one of said decantation chambers and wherein said pipe element of another of said stages is oriented inwardly with respect to said axis so as to recycle lighter liquids within said one of said decantation chambers.

* * * * *